Jan. 4, 1949. N. V. CHRISTENSEN ET AL 2,458,059
ELECTRICAL SEAMING APPARATUS
Filed Sept. 15, 1944 5 Sheets—Sheet 5
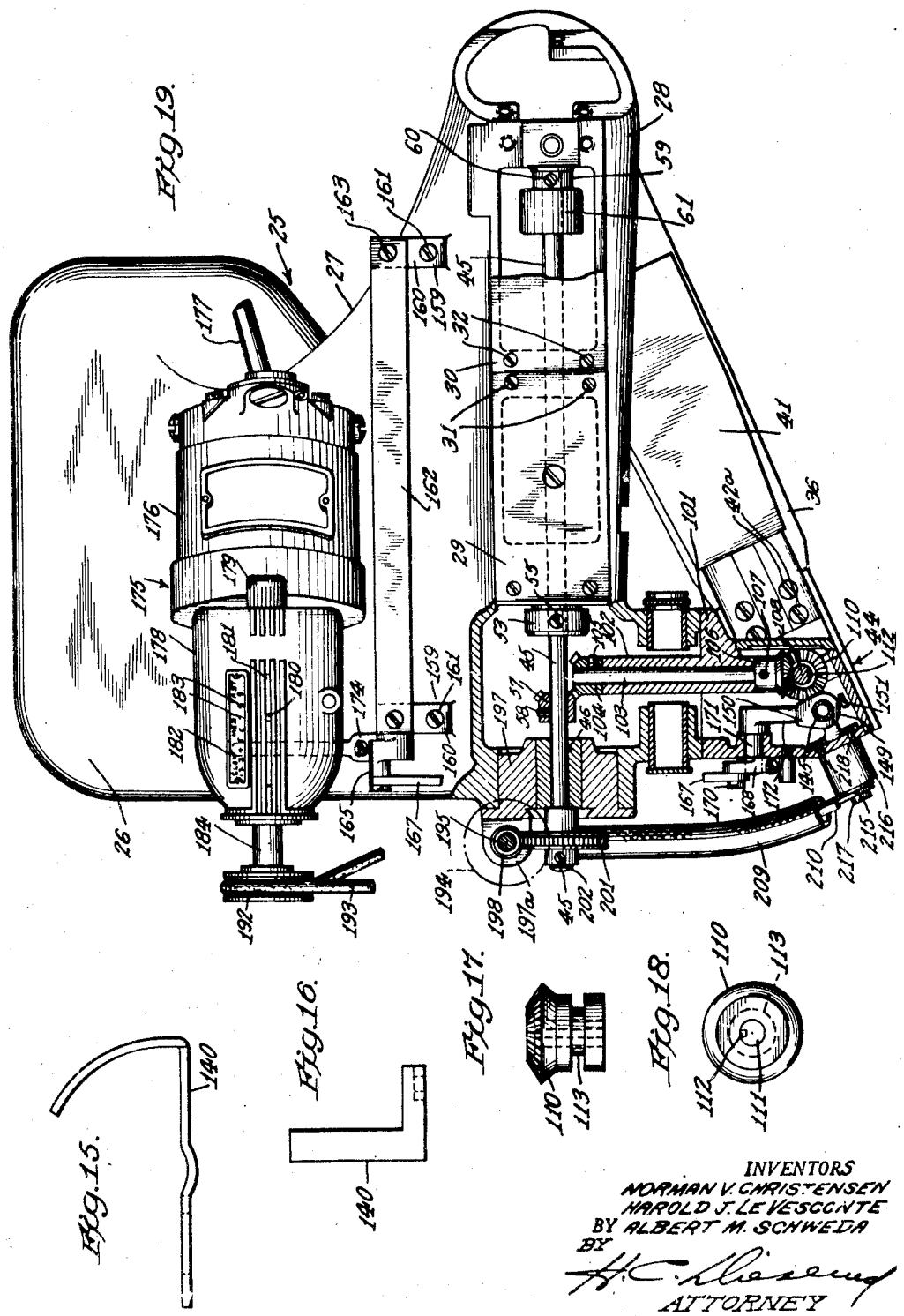
INVENTORS
NORMAN V. CHRISTENSEN
HAROLD J. LE VESCONTE
BY ALBERT M. SCHWEDA
BY
ATTORNEY Patented Jan. 4, 1949

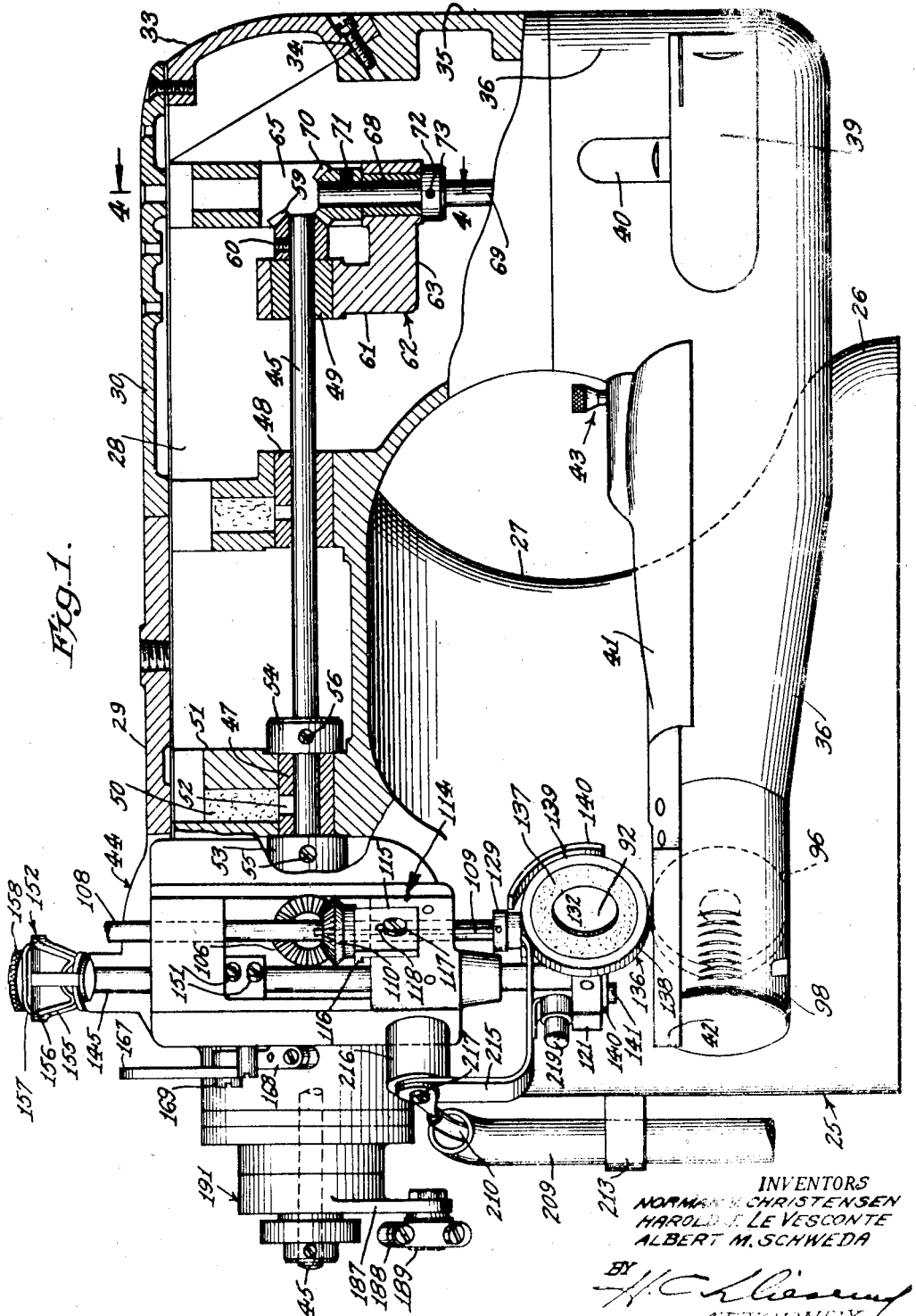

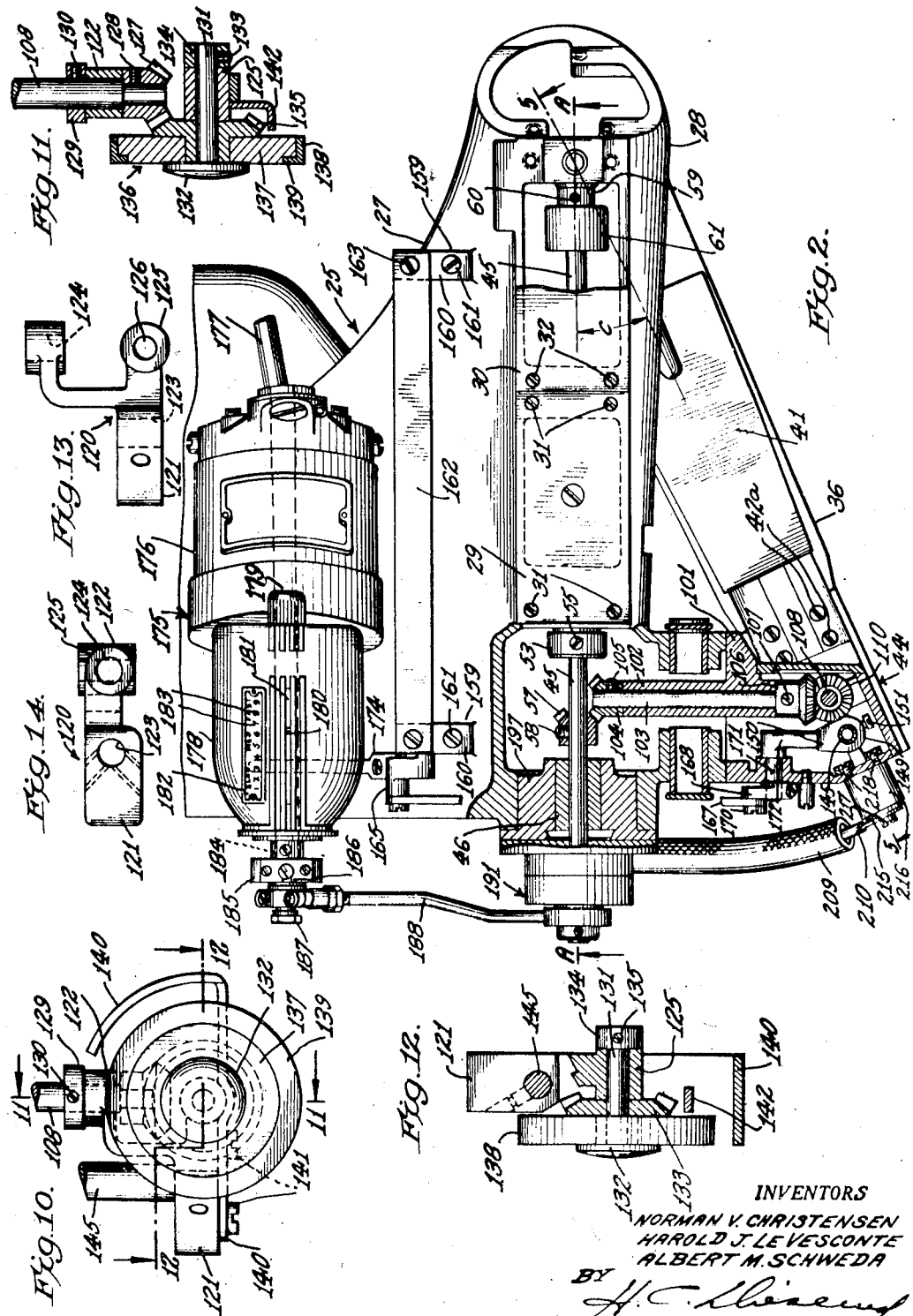

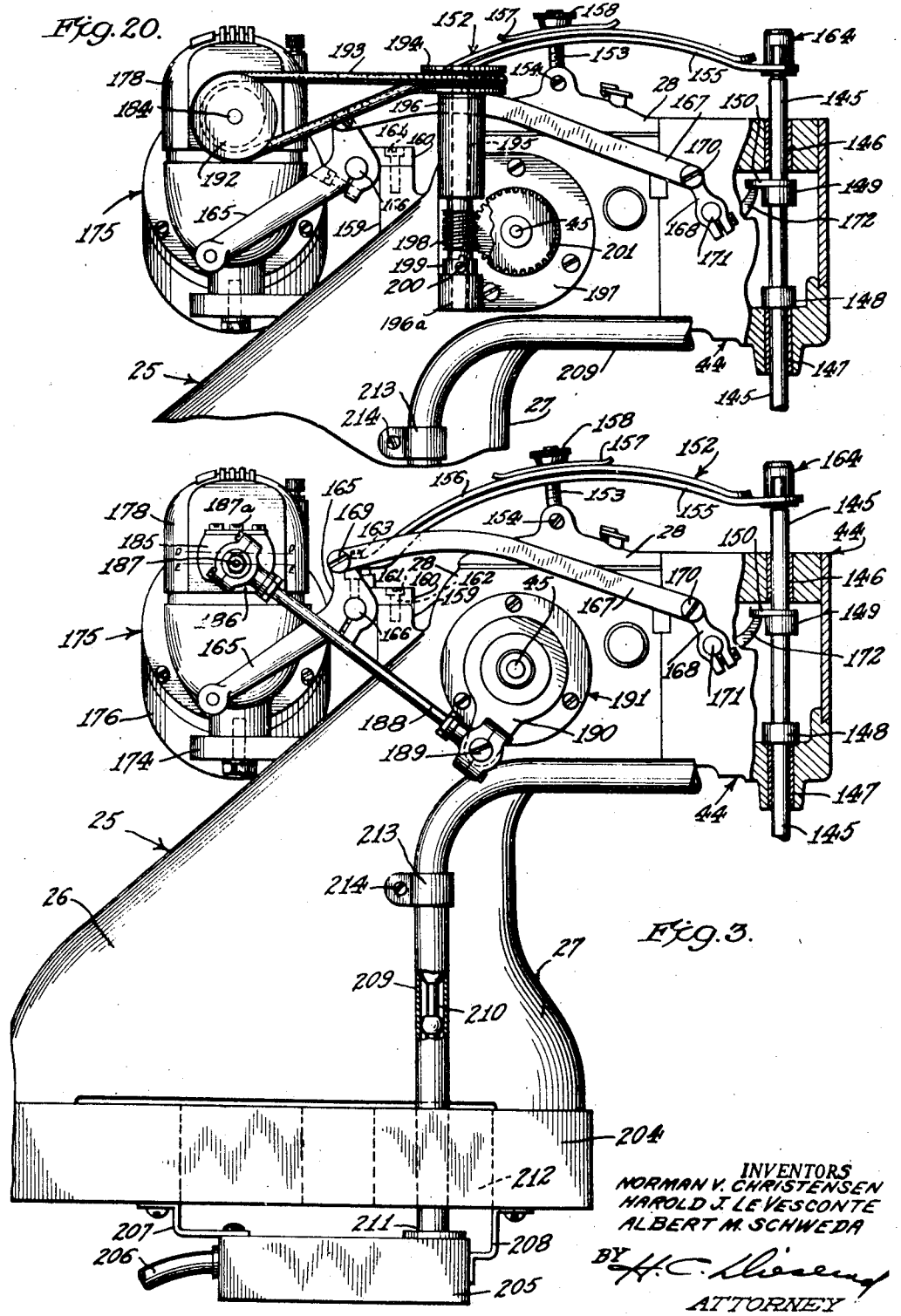

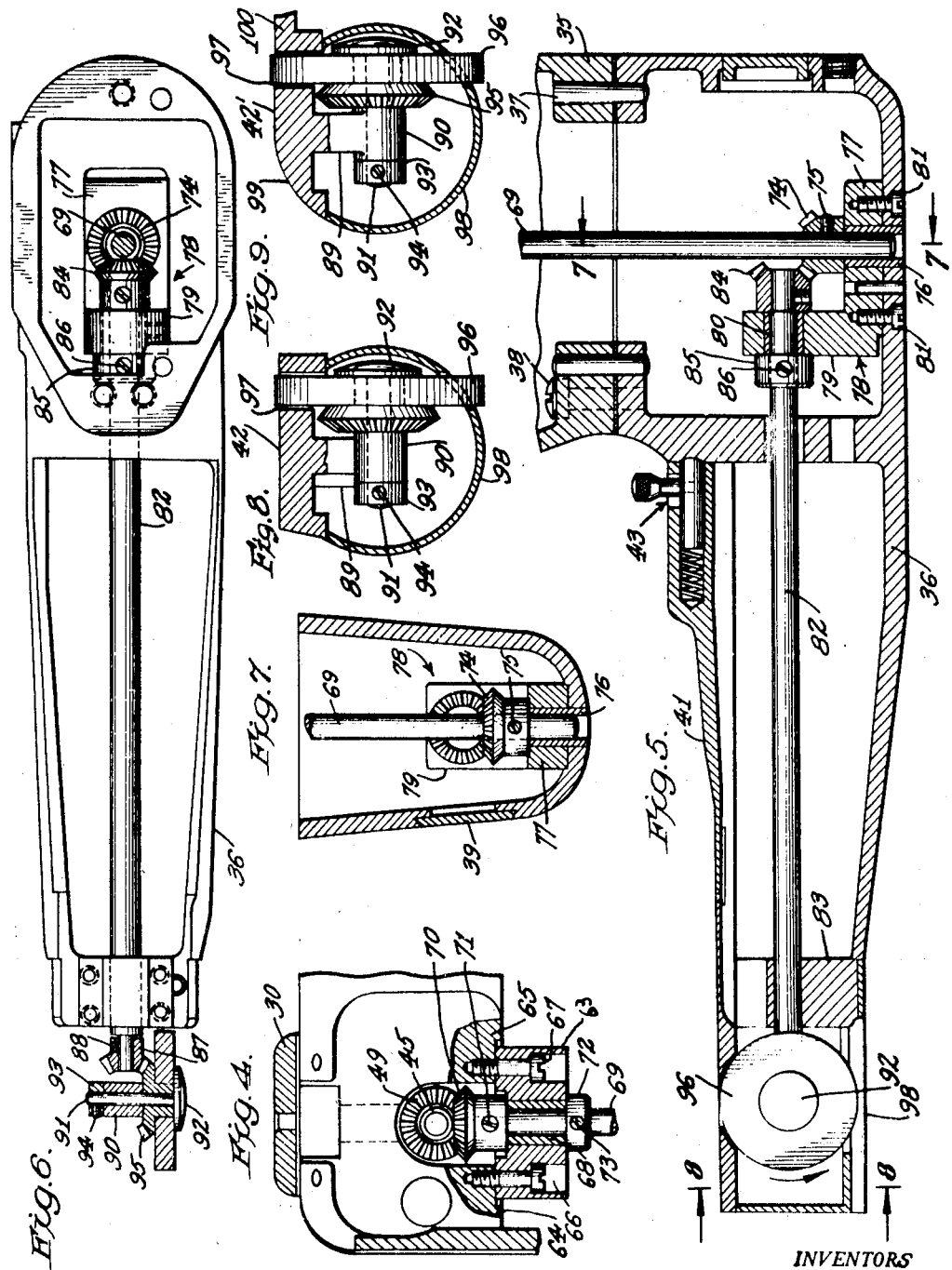

2,458,059

UNITED STATES PATENT OFFICE 2,458,059

ELECTRICAL SEAMING APPARATUS

Norman V. Christensen, Chicago, Ill., Harold J. Le Vesconte, Glendale, Calif., and Albert M. Schweda, Chicago, Ill., assignors to Union Special Machine Company, Chicago, Ill., a corporation of Illinois Application September 15, 1944, Serial No. 554,306

9 Claims. (Cl. 154—42)

This invention relates to apparatus for electrically seaming or uniting two or more parts, at least one of which becomes plastic upon being subjected to heat, and in its more specific aspects, is concerned with apparatus of this type which is adapted to form a seam or joining together of parts in a tubular article such as the sleeve or leg portion of an item of wearing apparel. The instant invention may be properly considered as relating to apparatus in the nature of an electronic sewing machine, inasmuch as it utilizes a high frequency electric current to obtain an effective and adequate union between two or more parts that are to be joined together.

This invention has for its primary object the provision of apparatus that is adapted to be advantageously employed in obtaining an effective and efficient bonding or uniting between two or more layers of material at least one of which is thermoplastic and dielectric in character, shaped to form a tubular article, by the use of an ultrahigh frequency electric current.

It is another object of this invention to provide apparatus of the above type in which the various parts are so constructed and arranged as not to obstruct the vision of the operator or interfere with the handling and manipulating of the material to be formed into a tubular article. A feature of the invention, toward this end, is the provision of a free ended, cylinder-like work supporting arm around which the work may be formed into tubular shape as the seaming operation is performed.

This invention has for another object the provision of apparatus of the character mentioned above in which certain work advancing devices may be operated either intermittently or continuously, as desired.

A further object of this invention is to provide apparatus of the type indicated which is simple in design, sturdy in construction, substantially free of vibration, reasonable in initial cost, substantially trouble-free in operation, and inexpensive to operate and maintain.

In accordance with our instant invention, we provide a frame that may consist of a base, having a portion extending upwardly and outwardly thereof, to form an overhang which terminates in an upper horizontal member that houses a main rotary shaft. The horizontal member of the frame has at one end a depending member, from the lower end of which there extends a tubular, laterally projecting horizontal work supporting arm. The work supporting arm is free at its outer end and so constructed and arranged as to provide clear space to the sides of and beneath the same. The arm is further so disposed with respect to the upper horizontal member that a vertical plane, longitudinal of the arm, forms an acute angle with a corresponding vertical plane, longitudinal of the upper horizontal member. Projecting laterally of one end of the upper horizontal member is a housing which supports a shaft that is adapted to cooperate with the main shaft and to impart rotation to one wheel or rotary electrode of this invention. A similar wheel, constituting the second rotary electrode of the invention, is carried proximate the free end of the work supporting arm, and extends slightly thereabove. Both wheels are preferably rotatable on substantially horizontal and parallel axes in substantially the same vertical plane, and are so disposed as to have their peripheral surfaces in opposition. The peripheral surfaces of the wheels are preferably spaced apart at all times. The lower wheel is disposed on a fixed axis while the upper wheel is on a vertically movable axis. Yielding means is provided to normally urge the upper wheel in a vertical direction toward the lower wheel. Provision is made to move the upper wheel in an opposite vertical direction against the action of the yielding means. This arrangement permits the wheels to accommodate themselves to varying thicknesses in the parts being joined together by the apparatus of our invention and allows the operator to increase the spacing between the wheels as may be found desirable and at his will. Appropriate connections, including shafts and gearing, are provided between the main shaft and both wheels to impart rotation in opposite directions to the wheels, simultaneously and preferably at the same angular velocity. The wheels may be rotated either continuously or intermittently, as will be more fully discussed hereinafter.

Each of the wheels or rotary electrodes is in electrical communication with a suitable high frequency electric current generator by means of a transmission line, which is preferably made of a length equal to substantially one-quarter of the wave length at the operating frequency, in order that maximum voltage may be applied to the parts to be united. The rotary electrodes have at least their peripheral portions formed of desirable electrically conductive material and are of sufficient mass to conduct away from the outer surfaces of the parts being united the heat developed therein, in order that only the contacting regions of the parts to be united are caused to become tacky and are thereby made to adhere to each other in a manner that will be readily understood by those skilled in the art from the detailed disclosure appearing hereinafter.

By virtue of the cooperative relative relationship of the various elements entering into the present invention, clear space is provided below the work supporting arm to permit the tubular article to be formed around the arm, to permit the operator's hand and arm to move freely between the work supporting arm and the other portions of the frame structure, and to bring various external operating parts of the apparatus within the field of vision of the operator.

The above enumerated objects and features, as well as additional objects and features, together with the advantages obtainable by the practice of the present invention, will be readily apparent to persons skilled in the art by reference to the following detailed description and the accompanying drawings which respectively describe and illustrate two embodiments of the invention, and wherein Figure 1 is a side elevational view of a machine having one embodiment of the invention, a part of the machine being shown in vertical cross-section and certain parts being omitted;

Figure 2 is a top plan view of the apparatus of Figure 1, with parts shown in transverse cross-section and with certain parts broken away and other parts removed;

Figure 3 is a rear end elevation of said embodiment of the invention, some parts being broken away and shown in vertical cross-section. Certain parts depicted in Figures 1 and 2 are omitted in Figure 3, while certain other parts, not shown in the other figures, are illustrated in Figure 3;

Figure 4 is a view partly in front elevation and partly in vertical cross-section along line 4—4 of Figure 1;

Figure 5 is a vertical sectional view of a portion of the machine, taken along line 5—5 of Figure 2;

Figure 6 is a top plan view of the work supporting arm of Figure 5, some parts being shown in horizontal cross-section and certain parts being removed;

Figure 7 is a transverse vertical section through the work supporting arm, taken along line 7—7 of Figure 5;

Figure 8 is a transverse vertical section through the work supporting arm, taken along line 8—8 of Figure 5;

Figure 9 is a view similar to Figure 8 and illustrates a modified form of work supporting arm;

Figure 10 is a side elevation of the upper wheel or rotary electrode and associated elements;

Figure 11 is a view in vertical section through the upper wheel, taken along line 11—11 of Figure 10;

Figure 12 is a horizontal sectional view taken along the broken line 12—12 of Figure 10;

Figures 13 and 14 are a side elevation and a top plan view, respectively, of a bracket or connector element associated with the upper electrode;

Figures 15 and 16 are side and end elevational views, respectively, of a guard member associated with the upper electrode;

Figures 17 and 18 are an elevation and a bottom plan view, respectively, of a bevel gear employed in the illustrative embodiment of the invention;

Figure 19 is a view similar to Figure 2 and illustrates a second embodiment of the invention; and Figure 20 is a rear end elevational view of the upper portion of the second embodiment of the invention and corresponds with part of Figure 3 of the first embodiment.

Referring more particularly to the drawings wherein like reference characters are used to denote corresponding parts throughout the several views, reference numeral 25 generally indicates a metallic frame including a base 26, a bracket 27 extending upwardly and outwardly of the base and terminating in a hollow horizontal upper member 28, which is provided with readily removable top cover plates 29 and 30 that are maintained in place by screws 31 and 32, respectively, and a removable front end cover plate 33 that is attached to the frame by screws such as that indicated by numeral 34 in Figure 1. A depending tubular member 35 may be cast integral with one end of upper member 28, and carries at its lower end a tubular laterally projecting horizontal work supporting arm 36. Arm 36 is maintained in desired angular position with respect to depending member 35 by means of one or more aligning pins 37 and screws 38, as indicated in Figure 5. A vertical plane, extending longitudinally of the axis of upper horizontal member 28, would cut the same along a line AA, while a similar vertical plane, extending longitudinally of the axis of work supporting arm 36, would intersect the first vertical plane and would cut the work supporting arm along the line 5—5 of Figure 2. These planes form an acute angle C. Arm 36 is provided with a horizontally slidable cover plate 39 and a vertically slidable cover plate 40 (Fig. 1) to provide ready access to the interior thereof. Arm 36 is also provided with a plurality of top cover plates including plate 41 and plate 42, the former being adapted to be retained in the illustrated position by a spring pressed latch, generally denoted by numeral 43. Extending laterally of upper horizontal member 28, adjacent its left end (Fig. 2), is a housing 44. This may be secured in any suitable way (not shown) to the member 28 of the main frame.

A main shaft 45, extending through the rear end of upper member 28, is rotatably supported in a plurality of bearing sleeves 46, 47, 48 and 49, which are suitably mounted within upper member 28. The bearing surfaces of the above-mentioned sleeves may be lubricated in any desired manner known to the art. For example, a packing material 50, that is saturated with an appropriate lubricant, is contained within an opening formed in supporting wall 51, with the result that the lubricant flows through a passage 52 in sleeve 47 to shaft 45. Collars 53 and 54 embrace shaft 45 and are affixed thereto by means of set screws 55 and 56, respectively, to restrain shaft 45 from objectionable axial movement during operation. Shaft 45 carries a pair of bevel gears of like size, namely, bevel gear 57, that is secured to the shaft intermediate sleeve 46 and collar 53 by a set screw 58, and a bevel gear 59, that is attached to the inner end of shaft 45 by a set screw 60. As will be observed in Figure 1, sleeve 49 is positioned in a vertical leg 61 of an L-bracket 62 that has its horizontal leg 63 connected to the under surface of partitions 64 and 65, integral with the frame, by screws 66 and 67, respectively (Fig. 4). Horizontal leg 63 is provided with a bearing sleeve 68 through which a vertical shaft 69 extends. A bevel gear 70 that mates with bevel gear 59 is affixed to the upper end of shaft 69 by a set screw 71 within the space between the ends of partitions 64 and 65. A collar 72, that is attached to shaft 69 by a set screw 73 immediately below bearing 68, prevents upward vertical movement of shaft 69 during operation.

As is shown in Figures 5 and 7, shaft 69 has a second bevel gear 74 attached thereto by a set screw 75. The lower end of shaft 69 is journaled in a sleeve 76, which is provided in a horizontal leg 77 of a second L-bracket 78, having a vertical leg 79 that is provided with a horizontal bearing sleeve 80. Leg 77 of L-bracket 78 rests on the bottom of work supporting arm 36 and is rigidly attached thereto by a plurality of screws 81.

A shaft 82 extends longitudinally within tubular work supporting arm 36 and is journaled proximate its opposite ends in sleeve 80 and an opening in a vertical wall 83 at the end of the cast portion of the work arm. Carried at one end of and rotatable with shaft 82 is a bevel gear 84 that is preferably of the same size as, and meshes with, bevel gear 74. A collar 85 is mounted on shaft 82 by a set screw 86 to cooperate with bevel gear 84 in preventing undesirable axial movement of said shaft. A bevel gear 87 is connected to the opposite end of shaft 82, beyond the wall 83, by means of a set screw 88.

Integral with end plate 42, which is secured by screws 42a (Fig. 2) to the wall 83, is a depending lug 89 that has a horizontally disposed sleeve 90 formed in its lower portion (Figs. 6 and 8). A pin 91, having a head 92, is mounted in sleeve 90 and carries a collar 93, secured by a set screw 94, at its free end. Rotatably mounted on pin 91, intermediate sleeve 90 and head 92, is a bevel gear 95 that meshes with bevel gear 87. As will be noted from an inspection of Figure 8, the axes of bevel gears 87 and 95 are coplanar, but at right angles to each other. A wheel 96, constituting one of the rotary electrodes of our invention, is concentric and rotatable with bevel gear 95 and should preferably be composed of a material having good electrical conductive properties. The periphery of wheel 96 extends through and slightly above a slot 97 in cover plate 42. A housing member 98, having a cylindrical wall portion complementary to the cover plate 42, and a vertical end wall, serves to enclose the gears 87 and 95 and related parts. It may be slotted, if desired, to permit the wheel 96 to extend through the same, as indicated in Figure 8. Any suitable means, such as screws, may be employed for attaching the housing member to the work arm casting.

The modification of the invention illustrated in Figure 9 differs from that depicted in Figure 8 primarily in the configuration of the top of the end cover plates. Cover plate 42' of Figure 9 has one side curved, as indicated at 99, while the opposite side carries a lateral extension or lip 100 to provide a wider working surface to the right of wheel 96 than that shown in Figure 8.

Turning next to housing 44 for a detailed discussion of the apparatus contained therein, it will be noted that the same is provided with an inwardly extending lug 101 that has integral therewith a sleeve-like extension 102. A shaft 103, rotatable in bearing 102, has its axis in the horizontal plane of, but at right angles to, the axis of main shaft 45. A bevel gear 104, that meshes with bevel gear 57, is attached by a set screw 105 to one end of shaft 103, while a second bevel gear 106 is attached by a set screw 107 to the opposite end of shaft 103. A vertical shaft 108 extends through housing 44 and is provided with a longitudinally extending slot or key-way 109 along a substantial portion of its length. A bevel gear 110, that is illustrated in detail in Figures 17 and 18, is provided with a central bore 111 to receive shaft 108 and a key 112 adapted to register with slot 109 in the shaft. Gear 110 is formed with an annular groove 113. A bracket element 114 (Fig. 1) has a vertical portion 115 and a horizontally extending yoke 116 that cooperates with annular groove 113 to rotatably support bevel gear 110. Element 114 is secured to housing 44 by a screw or bolt 117 that passes through a vertical slot 118 in portion 115. It will be observed that element 114 is thereby adjustable vertically to accurately position bevel gear 110 in proper mesh with gear 106. By virtue of the arrangement just described, bevel gear 110 and shaft 108 are simultaneously rotated upon rotation of bevel gear 106. Bevel gear 110 is restrained from vertical movement by element 114, but shaft 108 is vertically movable with respect to bevel gear 110 through the co-action of key 112 and slot 109.

In Figures 13 and 14 there is illustrated a bracket or connector 120 consisting of arms 121 and 122 that are provided with parallel bores 123 and 124, respectively, and a third arm 125 that is provided with a bore 126 having its axis normal to that of bore 124 and substantially but not quite normal to the plane of the axes of bores 123 and 124. As is shown in Figures 10 and 11, shaft 108 extends through bore 124 of arm 122 and carries a bevel gear 127, attached by set screw 128, at its lower end. A collar 129 embraces shaft 108 immediately above arm 122 and is secured to the shaft by means of a set screw 130. A pin 131, having a head 132, extends through and is rotatably supported in bore 126 of arm 125. A bevel gear 133 that meshes with bevel gear 127 is carried by pin 131 intermediate head 132 and arm 125. The free end of pin 131 has a collar 134 connected thereto by a set screw 135. A wheel, generally denoted by reference numeral 136, carried by and rotatable with bevel gear 133, and constituting the other rotary electrode of the apparatus of our invention, includes a main body portion 137 that is made of a suitable electrical insulating material and a rim of good electrical conductivity consisting of an annular ring 138 and an inwardly extending radial flange 139. A guard 140, two views of which are illustrated in Figures 15 and 16, is connected to the under surface of arm 121 of connector 120 by means of screws 141. This guard has a curved portion so constructed and arranged in spaced relation to the peripheral surface of wheel 136 as to protect the operator's hand from coming in contact with said wheel. A somewhat similar guard 142 is located in the region of bevel gear 133.

A tubular rod 145, vertically slidable in bushings 146 and 147 (Fig. 3) extends through and beyond the top and bottom of housing 44. The lower end of rod 145 is suitably locked in bore 123 of arm 121 of connector 120. A collar or similar means 148 adjustably limits downward movement of rod 145. A member 149, embracing rod 145 and having a lateral extension 150, is secured to the rod by set screws 151 (Figs. 1 and 2).

Wheels or rotary electrodes 96 and 136 are disposed on substantially horizontal and parallel axes that are located in a substantially vertical plane. The axis of lower wheel 96 is fixed, whereas the axis of upper wheel 136 is vertically movable. The peripheral surfaces of the rotary wheels are in opposition and are preferably spaced apart at all times at least a minimum distance, as determined by a collar 148 on rod 145. The shaft and bevel gear arrangement, heretofore described, is such that wheels 96 and 136 are rotated simultaneously in opposite directions and at the same angular velocity.

The apparatus of this invention includes a mechanism for normally and yieldingly urging rod 145, and consequently connector 120, shaft 108, and wheel 136 downwardly to its lowermost position. A mechanism that may be advantageously employed for this purpose is illustrated in Figures 3 and 20, wherein the same is generally denoted by numeral 152. This includes an upwardly projecting bolt 153 that is pivotally supported at its lower end by a horizontal pin 154 and that extends through a spring assembly consisting of a plurality of leaf springs 155, 156 and 157. A knurled adjusting nut 158 is in threaded engagement with the upper end of bolt 153 and bears against the upper surface of leaf spring 157 to tension the springs to any extent desired. A pair of vertical lugs 159 are formed integral with bracket 27, and each lug carries a laterally projecting arm 160 that is secured to the lug by a screw 161. A cross-bar 162 is secured to the outer end of each arm 160 by means of a screw or bolt 163 and may be used to support auxiliary attachments (not shown). One end of lower leaf spring 155 is connected to cross-bar 162 by means of the left-hand bolt 163, while the opposite end of this spring is coupled to rod 145 by a swivel cap 164. It will be apparent that the mechanism just described tends to yieldingly urge rod 145 in a vertically downward direction, and to the position shown in Figure 3.

Reference is now had to an arrangement of apparatus for simultaneously moving rod 145, connector 120, shaft 108 and wheel 136 vertically upward against the action of spring mechanism 152. A preferred arrangement of this character is illustrated in Figures 2 and 3, and comprises a bell crank 165 pivotally supported by a pin 166 that extends laterally and to the side of the left-hand arm 160 (Fig. 2). A link 167 is pivotally connected at its opposite ends to bell crank 165 and to an arm 168 through the medium of screws 169 and 170, respectively. Arm 168 is clamped to a horizontal rock-shaft 171 extending through and supported in a vertical wall of housing 44, and having an arm 172 formed integral therewith, said arm being adapted to bear against the under surface of lateral extension 150. A downward pull may be imparted to the free end of bell crank 165 by means of an appropriate cable or the like (not shown) that is connected to a foot treadle or a knee operated member (also not shown). Such a downward pull rocks crank 165 in a counter-clockwise direction, as viewed in Figure 3, thereby moving link 167 toward the left and imparting an increment of counter-clockwise rotation to arm 168. Since arm 168 is clamped to rock-shaft 171, the latter will also be rotated in a counter-clockwise direction, with the result that the free end of arm 172 will move lateral extension 150 of member 149, rod 145, and the associated apparatus upwardly against the action of mechanism 152.

A bracket 174, cast integral with and extending laterally of frame bracket 27, supports a variable speed driving unit 175 that serves as the prime mover of the machine. Driving unit 175 preferably consists of a suitable electric motor 176, that is supplied with electrical energy from a convenient source (not shown) by a conductor cable 177, and a conventional type of speed controller 178 in the transmission from the motor. Speed controller 178 is provided with a rotatable knob 179 for manually adjusting the same, which knob also operates an indicator pointer 180 that rides in a slot 181. Mounted on the speed controller parallel to slot 181 is a plate 182 having graduations or like indicia 183 that serve as visual aids in the adjustment of the speed of driving unit 175. A drive shaft 184 extends beyond one end of the driving unit for connection in a suitable manner with the main shaft of the machine.

Reference is next had to the embodiment of the invention illustrated in Figures 1, 2 and 3 for a full understanding of one suitable type of connection between drive shaft 184 of the driving unit and main shaft 45 in upper horizontal member 28, for imparting simultaneous and intermittent rotation to rotary electrodes 96 and 136. This apparatus includes a plate 185 secured to the exposed end of drive shaft 184 and rotatable therewith. Plate 185 is grooved at 186 to adjustably receive the square head of a ball stud 187 whose axis is parallel with, but eccentric, to the axis of drive shaft 184. The extent of eccentricity of the axis of ball stud 187, with respect to the axis of drive shaft 184, is indicated by the distance between lines DD and EE (Fig. 3) which represent horizontal planes along the respective axes. This eccentricity may be varied by adjusting the ball stud along the groove 186 by means of a screw 187a. A rod 188, adjustable in length, is pivotally coupled at opposite ends to ball stud 187 and to a second ball stud 189 that is carried at the free end of an arm 190. As will be observed from an examination of the drawings, rotation of plate 185 results in oscillation of arm 190 which is connected to a clutch mechanism 191 that is in part carried by main shaft 45. Clutch mechanism 191 may be of any desired type known to the art, such as that illustrated and described in Hacklander Patent 2,043,749. It is sufficient to point out that the movements imparted to arm 190 in one direction serve to actuate a member of clutch mechanism 191 which is secured to shaft 45 in a manner to intermittently rotate said shaft and the associated shafts and bevel gears so as to correspondingly drive rotary electrodes 96 and 136 simultaneously and intermittently in opposite directions. Movements of the arm 190 in the opposite direction are idle and means are provided in the clutch mechanism for preventing reverse movement of shaft 45 at this time.

The second embodiment of the invention pertains to apparatus cooperating with drive shaft 184 of driving unit 175 to impart continuous rotation to main shaft 45 and thence to rotary electrodes 96 and 136. The means for obtaining this continuous rotation is illustrated in Figures 19 and 20 and comprises a drive pulley 192 connected to the end of shaft 184 and rotatable therewith. Rotation of drive pulley 192 is transmitted through the medium of a belt 193 to a driven pulley 194 that is fastened at the upper end of a vertical shaft 195. Shaft 195 is journaled in vertically spaced bearings 196 and 196a carried by projections from an end closure member 197 of the part 28 of the frame. Concentric with shaft 195 and intermediate bearings 196 and 196a is a worm gear 198 which is keyed to a collar 199 that is attached to shaft 195 by a set screw 200 to the end that the worm gear rotates with this shaft as the driving unit is operated. Worm gear 198 mates with a worm wheel 201 that is affixed to the outer end of main shaft 45 by a set screw 202.

Referring next to Figures 1 and 3, we have illustrated therein a table, or the like 204, for supporting the frame 25 and means for supplying a suitable high frequency electric current to rotary electrodes 96 and 136. This means includes an ultra-high frequency oscillation generator 205 of any suitable construction that is connected to an appropriate source of electrical supply (not shown) by a conductor cable 206 and that is suspended below table 204 by a pair of brackets 207 and 208. Concentric lines, consisting of an outer tubular conductor 209 and an inner conductor 210 that emerge from generator 205 at 211, pass through an opening 212 in table 204 and transmit the high frequency current to the wheels or rotary electrodes 96 and 136 in a manner about to be explained.

Conductor 209 is attached to frame 25 by means of an electrically conductive bracket 213 surrounding the conductor and a screw 214 by which the bracket is fastened to the frame; hence the conductor is in electrical communication with rotary electrode 96 which is grounded to the frame. Inner conductor 210 is in series electrical communication with an L-shaped spring strip conductor 215 and ring 138 of rotary electrode 136 with which the free end of the spring strip is resiliently engaged. Inner conductor 210 and spring strip conductor 215 are attached to an insulator 216 by a screw or terminal post 217. Insulator 216 is attached to housing 44 in any convenient manner, such as by means of screws 218 (Fig. 2). A small neon lamp 219 is in electrical communication with spring strip conductor 215 and has its other terminal grounded, thereby serving to visually indicate the presence of the high frequency current in the circuit.

As was indicated earlier herein, the means for transmitting the high frequency current from oscillation generator 205 to rotary electrodes 96 and 136 should preferably be of a length equal to substantially one-quarter of the wave length at the operating frequency, in order that maximum voltage may be applied to the parts that are to be bonded together. The frequency of the current supplied by oscillation generator 205, and the electrical power input to rotary electrodes 96 and 136 are factors which may be readily determined by persons skilled in the art, and will depend at least in part upon the character of the parts to be joined together and the nature of the bond to be obtained. At least one of the parts to be united should be thermoplastic in character or a thermoplastic strip should be inserted between these parts. The high frequency current creates an electric field in the dielectric parts to be united in the region of their contact with the rotary electrodes, and the heat generated in these parts by this electric field causes the thermoplastic part or parts to become sticky or tacky, whereby they are joined together. The rotary electrodes should have good heat conducting properties to dissipate as much as possible the heat developed at the surfaces of the material directly engaged by the electrodes and thus prevent any tendency to stick to the electrodes. The peripheral surfaces of the rotary electrodes may be smooth, as illustrated, or may be roughened, in order to provide better traction for the work as it is fed between and beyond the electrodes.

It will be understood that the same arrangement as described in the foregoing may be employed in connection with the modified construction of Figures 19 and 20 for delivering a high frequency current to the electrodes thereof.

The operation of the machine is believed to be clear but a brief résumé will be given. Alternating electric current as ordinarily available, at say 110 volts and 60 cycles, will be delivered through cables 177 and 206 to the driving unit 175 and the high frequency oscillator, respectively. The operator will be seated in front of the right-hand end of the work supporting arm 36 (Figs. 1 and 2) and will be facing along this arm. The work, which may be flat sheet material to be formed into a tube or series of tubes, is folded by the operator around the work arm in advance of the wheels 96 and 136 and the edges are overlapped to any extent desired. Upper roller 136 is raised slightly, by rocking the bell crank 165 through treadle control or the like, sufficiently to enable insertion of the forward end of the work between the rollers. Motor 176 is then set in operation or, if desired, a clutch may be engaged to couple the motor with the main shaft 45 of the machine. Depending upon the form of the invention adopted, the shaft 45 will be rotated either continuously or intermittently in a series of short increments of rotation. This rotation of the shaft 45 will be transmitted to the wheels 96 and 136 which will thus serve to advance the work along and then off of the work arm. At the same time the high frequency current will be passed between the wheels or electrodes thereby producing a seam in the form of a line of adhesion between the overlapped portions of the work. If the operation of shaft 45 is intermittent, as in the first embodiment, a sort of stitch effect may be produced in the uniting of the edges of the work. A continuous series of spots will be created at which a more effective bond is provided between the layers of the work due to the prolonged time interval allowed between the successive movements of the work. When a particular seaming operation has been completed the current to the motor and to the oscillator is preferably cut off.

From the foregoing it is believed that the construction, operation and advantages obtainable by the practice of our instant invention will be readily understood by persons skilled in the art. It is to be borne in mind, however, that various changes in the apparatus, herein illustrated and described, may be resorted to without departing from the spirit of the invention or the scope of the subjoined claims.

We claim:

1. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm and cooperating to feed material placed therebetween, at least the peripheral portion of each wheel being electrically conductive, and means adapted to be connected to a source of high frequency current for creating a high frequency electric field between the peripheral portions of the wheels, said means including said wheels.

2. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel carried proximate one end of the arm, said wheel having its major portion within the peripheral confines of the arm and a marginal portion in registration with the slot and projecting slightly beyond the exterior surface of the arm, a wheel carried by the upper member in cooperative relation to the first-mentioned wheel, said wheels being arranged for rotation on substantially horizontal and parallel axes that lie in a substantially vertical plane and cooperating to feed material placed therebetween relative to and toward the other end of the arm, at least the peripheral portion of each wheel being electrically conductive, and means adapted to be connected to a source of high frequency current for creating a high frequency electric field between the peripheral portions of the wheels, said means including said wheels.

3. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm and with their peripheral surfaces in opposing relation, means for urging one wheel in a substantially vertical direction toward the other wheel, means for moving said one wheel in a reverse direction against the action of the first-named means, means for rotating the wheels in opposite directions, said wheels being arranged to feed material placed therebetween, and means adapted to be connected to a source of high frequency current for creating a high frequency electric field between the peripheral portions of the wheels, said means including said wheels.

4. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm, at least the peripheral portion of each wheel being electrically conductive, means for rotating the wheels simultaneously and intermittently in opposite directions, said wheels being arranged to feed material placed therebetween, and means adapted to be connected to a source of high frequency current for creating a high frequency electric field between the peripheral portions of the wheels when the wheels are separated, said means including said wheels.

5. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm and with their peripheral surfaces in opposing relation, means for urging one wheel in a substantially vertical direction toward the other wheel, means for moving said one wheel in a reverse direction against the action of the first-named means, means for rotating the wheels simultaneously and intermittently in opposite directions, said wheels being arranged to feed material placed therebetween, and means adapted to be connected to a source of high frequency current for creating a high frequency electric field between the peripheral portions of the wheels, said means including said wheels.

6. In apparatus for bonding a plurality of layers of material, at least one of which is thermoplastic, a base, a bracket extending upwardly and outwardly of the base, a depending member carried by the upper part of the bracket, a tubular arm having a slot formed therein secured to one end of the depending member and projecting laterally thereof, an upper member affixed to the bracket and disposed above the arm in spaced relation thereto, a wheel carried by the arm proximate the free end thereof, said wheel having its major portion within the peripheral confines of the arm and a marginal portion in registration with the slot and projecting slightly beyond the exterior surface of the arm, a wheel carried by the upper member above the first-named wheel, said wheels being arranged for rotation on substantially horizontal and parallel axes in a substantially vertical plane generally normal to the arm and with their peripheral surfaces in opposing relation, at least the peripheral portion of each wheel being electrically conductive, means for normally urging one wheel in a substantially vertical direction toward the other wheel, means for moving said one wheel in the opposite direction against the action of the first-named means, means for rotating the wheels simultaneously and intermittently in opposite directions, said wheels being arranged to feed material placed therebetween, and means adapted to be connected to a source of high frequency current for creating a high frequency electric field between the peripheral portions of the wheels, said means including said wheels.

7. In apparatus for bonding a plurality of layers of material, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm, at least the peripheral portion of each wheel being electrically conductive, means for imparting continuous rotation to the wheels in opposite directions, said wheels being arranged to feed material placed therebetween, and means adapted to be connected to a source of high frequency current for creating a high frequency electric field between the peripheral portions of the wheels when the wheels are separated, said means including said wheels.

8. In apparatus for bonding a plurality of layers of materials, at least one of which is thermoplastic, a lower member comprising a tubular arm having a slot formed in the upper portion thereof, an upper member secured to the lower member and disposed above and spaced from the arm, a wheel having its major portion within the peripheral confines of the arm and a marginal portion in registration with the slot and projecting thereabove, a wheel carried by the upper member in cooperative relation to the first-mentioned wheel, said wheels being arranged for rotation on substantially horizontal and parallel axes lying in a substantially vertical plane that is generally normal to the arm and with their peripheral surfaces in opposing relation, means for urging one wheel in a substantially vertical direction toward the other wheel, means for moving said one wheel in a reverse direction against the action of the first-named means, means for imparting continuous rotation to the wheels in opposite directions, said wheels being arranged to feed material placed therebetween, and means adapted to be connected to a source of high frequency current for creating a high frequency electric field between the peripheral portions of the wheels, said means including said wheels.

9. In apparatus for bonding a plurality of layers of material, at least one of which is thermoplastic, a base, a bracket extending upwardly and outwardly of the base, a depending member carried by the upper part of the bracket, a tubular arm having a slot formed therein secured to one end of the depending member and projecting laterally thereof, an upper member affixed to the bracket and disposed above the arm in spaced relation thereto, a wheel carried by the arm proximate the free end thereof, said wheel having its major portion within the peripheral confines of the arm and a marginal portion in registration with the slot and projecting slightly beyond the exterior surface of the arm, a wheel carried by the upper member above the first-named wheel, said wheels being arranged for rotation on substantially horizontal and parallel axes in a substantially vertical plane generally normal to the arm and with their peripheral surfaces in opposing relation, at least the peripheral portion of each wheel being electrically conductive, means for normally urging one wheel in a substantially vertical direction toward the other wheel, means for moving said one wheel in the opposite direction against the action of the first-named means, means for imparting continuous rotation to the wheels in opposite directions, said wheels being arranged to feed material placed therebetween, and means adapted to be connected to a source of high frequency current for creating a high frequency electric field between the peripheral portions of the wheels, said means including said wheels.

NORMAN V. CHRISTENSEN.
HAROLD J. LE VESCONTE.
ALBERT M. SCHWEDA.

REFERENCES CITED

The following references are of record in the file of this patent:

UNITED STATES PATENTS

| Number | Name | Date |
|---|---|---|
| 1,268,306 | Wentworth | June 4, 1918 |
| 1,765,206 | Christensen | June 17, 1930 |
| 1,837,468 | Merritt | Dec. 22, 1931 |
| 2,049,292 | Feldmann | July 28, 1936 |
| 2,125,758 | Waters | Aug. 2, 1938 |
| 2,170,948 | Meyer | Aug. 29, 1939 |
| 2,324,068 | Crandell | July 13, 1943 |
| 2,343,975 | Hosfield | Mar. 14, 1944 |

OTHER REFERENCES

"Electronics," August 1943, "An Electronic Sewing Machine," pp. 91–93, 160, 162, 164, 166 and 168.